United States Patent [19]

Kageyama et al.

[11] Patent Number: 5,179,462
[45] Date of Patent: Jan. 12, 1993

[54] LASER BEAM COMPOSITE APPARATUS

[75] Inventors: Hitoshi Kageyama, Kawasaki; Nobuo Kanai, Toyohashi, both of Japan

[73] Assignee: Minolta Camera Co., Ltd., Osaka, Japan

[21] Appl. No.: 896,756

[22] Filed: Jun. 10, 1992

[30] Foreign Application Priority Data

Jun. 14, 1991 [JP] Japan .................. 3-170514

[51] Int. Cl.⁵ .................. G02B 26/10; G02B 27/14
[52] U.S. Cl. .................. 359/204; 359/490; 359/618; 359/629; 359/634; 358/296; 346/108; 250/578.1
[58] Field of Search ......... 359/618, 629, 634, 639, 359/204, 212–214, 216–221, 900, 196, 487–490; 250/234–236, 578.1; 362/231; 346/108, 160; 358/296

[56] References Cited

U.S. PATENT DOCUMENTS

| | | | |
|---|---|---|---|
| 4,637,679 | 1/1987 | Funato | 359/204 |
| 4,911,532 | 3/1990 | Hidaka | 350/174 |
| 4,961,079 | 10/1990 | Owens et al. | 359/618 |
| 5,012,259 | 4/1991 | Hattori et al. | 346/108 |
| 5,018,805 | 5/1991 | Kessler | 346/160 |
| 5,067,799 | 11/1991 | Gold et al. | 359/490 |
| 5,087,928 | 2/1992 | Okino | 358/296 |
| 5,113,279 | 5/1992 | Hanamoto et al. | 359/196 |

FOREIGN PATENT DOCUMENTS 58-79215 5/1983 Japan.
60-201319 10/1985 Japan.

*Primary Examiner*—Bruce Y. Arnold
*Assistant Examiner*—James Phan
*Attorney, Agent, or Firm*—Price, Gess & Ubell

[57] ABSTRACT

A laser beam composite apparatus which combines more than three beams including a first beam having a first wavelength, a second beam having a second wavelength and polarized in a predetermined direction and a third beam having a second wavelength and polarized in a direction perpendicular to said polarized direction of said second beam. The laser beam composite apparatus combines the first beam and the second beam based on difference of wavelengths thereof and further combines the third beam based on difference of polarized directions thereof.

10 Claims, 5 Drawing Sheets $\lambda 2 > \lambda 1$

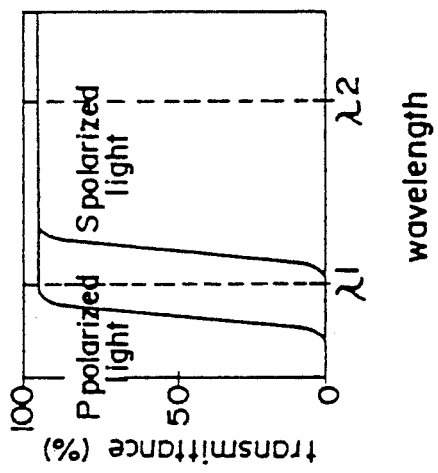
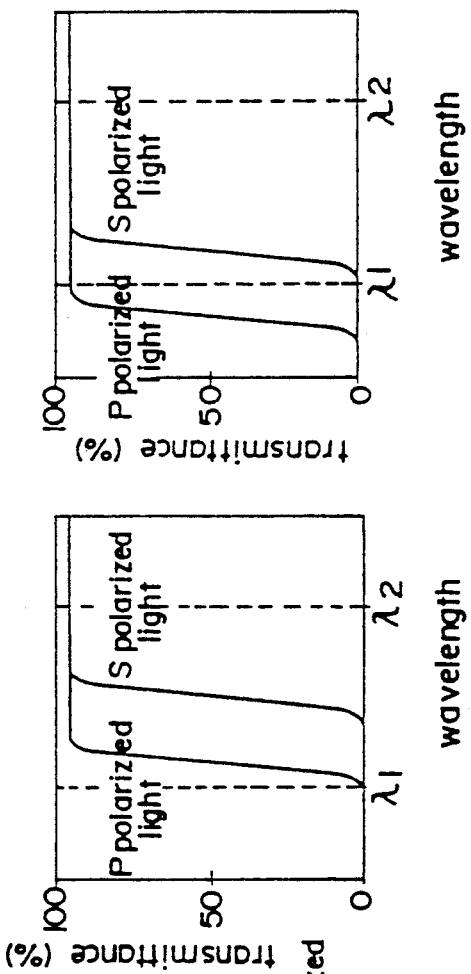
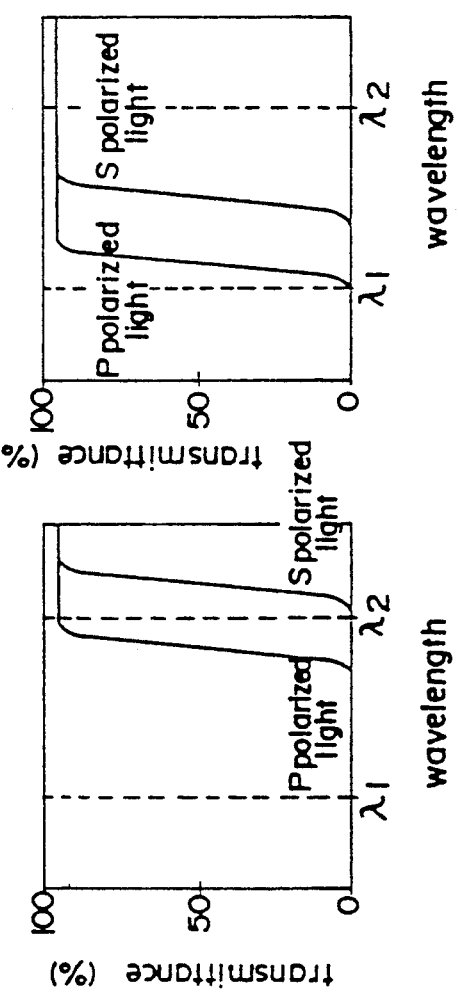

LASER BEAM COMPOSITE APPARATUS

BACKGROUND OF THE INVENTION

1. Field of the Invention

The present invention relates to a laser beam composite apparatus for use in the optical systems of image forming apparatus.

2. Description of the Related Art

Image forming apparatus of the electrophotographic type such as is used in digital type copying apparatus, laser printers and the like, scan the surface of a photosensitive member by exposing said surface via laser beams modulated in accordance with image signals and deflected by polygonal mirrors.

When the aforementioned apparatus form multicolor images, a plurality of laser beams corresponding to the respective colors are used to expose the surface of a single photosensitive member at different positions thereon, or to expose the surfaces of a plurality of photosensitive members.

When a plurality of individual laser beams are deflected using a plurality of polygonal mirrors, the optical system becomes more complex and larger in size, and relative positional dislocation of the various colors readily occurs.

Accordingly, optical systems used for forming multicolor images generally are constructed so as to combine a plurality of laser beams into a single composite beam, deflect said single beam via a single polygonal mirror, and thereafter split said single composite beam into the original plurality of beams which are guided to their respective exposure positions.

Conventional laser beam combining methods include well known methods for combining two beams which have been split by a beam splitter so as to have mutually dissimilar polarization directions, and methods using dichroic mirrors having wavelength selectivity so as to combine a plurality of beams having mutually dissimilar wavelengths into a single beam. However, methods which combine beams of mutually dissimilar polarization directions are limited to combining two beams. Furthermore, although methods which combine beams of dissimilar wavelengths can combine three or more beams, the wavelength range (frequency band range) of the composite beam increases as the number of combined beams increases, such that certain disadvantages arise inasmuch as excellent multicolor images cannot be obtained due to the optical characteristics (color aberration and the like) of the lens system through which the composite beam passes and the spectral sensitivity characteristics of the photosensitive member.

SUMMARY OF THE INVENTION

A main object of the present invention is to provide an improved image forming apparatus which eliminates the previously described disadvantages.

An object of the present invention is to combine three or more laser beams while restricting divergence in the wavelength range of the composite beam.

The aforesaid objects are achieved by providing the laser beam composite apparatus of the present invention comprising a first beam generating means for generating a first beam having a first wavelength, second beam generating means for generating a second beam having a second wavelength and polarized in a predetermined direction, third beam generating means for generating a third beam having a second wavelength and polarized in a direction perpendicular to said polarized direction of said second beam, first composite means having a dichroic mirror which reflects one of either said first beam or said second beam and transmits therethrough the other beam whereby said first composite means guides said first beam and said second beam entering from different directions in the same direction so as to combine said beams, and second composite means having a dichroic mirror which reflects one of either said composite beam combined by said first composite means which guides the aforesaid first and second beams entering from different directions in the same direction or the third beam and transmits therethrough the other beam whereby said second composite means guides the composite beam and third beam entering from different directions in the same direction so as to combine said beams.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 5a through 5c are illustrations showing the properties of the dichroic mirrors shown in FIG. 4.

DETAILED DESCRIPTION OF THE PREFERRED EMBODIMENTS

Figure 1:
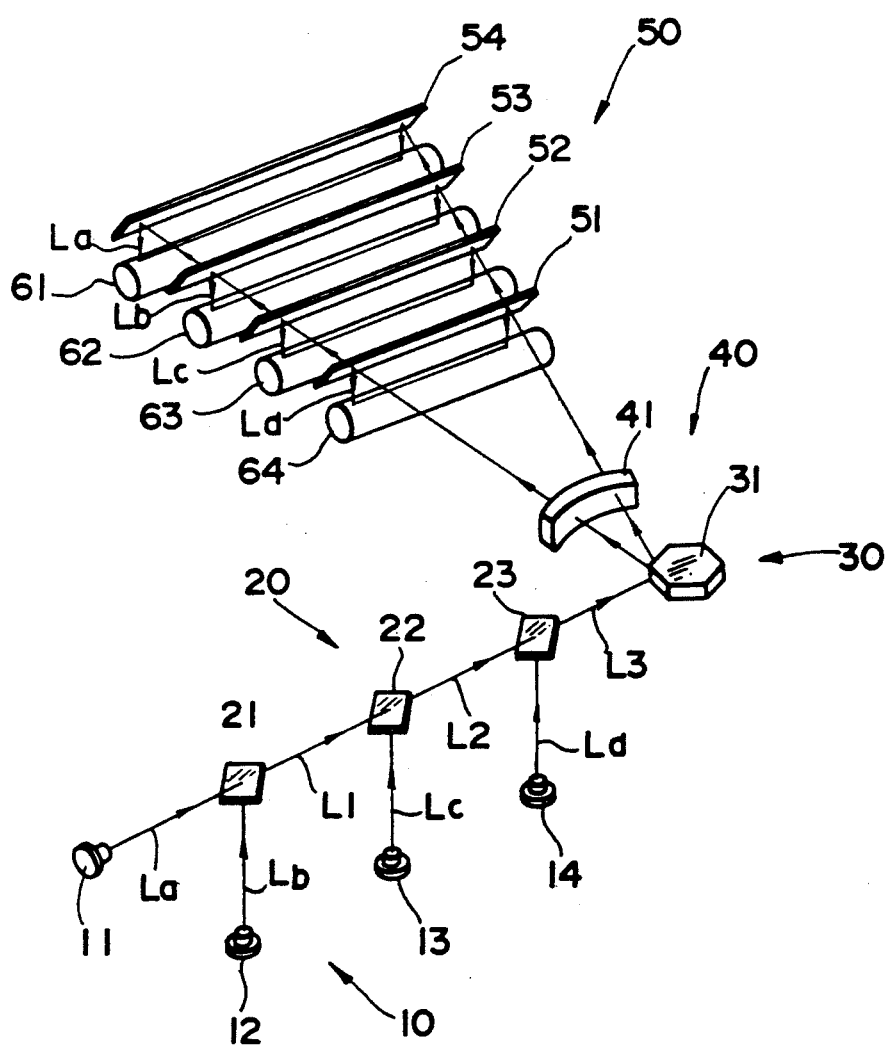
FIG. 1 is a perspective view briefly showing the construction of the optical system of the present invention.

FIG. 1 is a perspective view briefly showing the construction of the optical system of the present invention.

The optical system 1 of the present invention has a laser beam generating source 10 comprising four semiconductor lasers 11 through 14, beam composite apparatus 20 comprising three dichroic mirrors 21 through 23, beam deflecting device 30 comprising polygonal mirror 31, optical lens system 40 comprising fθ lens 41, and beam splitting device 50 comprising three dichroic mirrors 51 through 53 and one reflecting mirror 54.

The four laser beams La, Lb, Lc and Ld emitted from the respective semiconductor lasers 11 through 14 are sequentially overlaid and combined or superimposed one by one via the beam composite apparatus 20 described later.

The laser beam L3 emitted from the beam composite apparatus 20 is deflected for scanning by the high-speed rotatable polygonal mirror 31, then separated into the original four beams La through Ld by the beam splitting device 50. These four laser beams La through Ld respectively scan the exposure receiving members, i.e., the four photosensitive drums 61 through 64.

The optical lens system 40 is provided to assure a constant scanning speed of the surfaces of the photosensitive drums 61 through 64.

In the following description, "laser beam" will be abbreviated to "beam."

The dichroic mirrors are briefly described hereinafter.

The dichroic mirrors are provided with partially reflective film alternately superimposed on dielectric layers having different refractive indices, and have specific wavelength selectivity for reflecting light in the short wavelength range and transmitting light in the long wavelength range. The wavelength selectivity has characteristics that differ in the direction of polarized entering light relative to the action surface (i.e., reflecting surface and transmitting surface); these characteristics are referred to as "polarization selectivity" hereinafter.

Figure 3A:
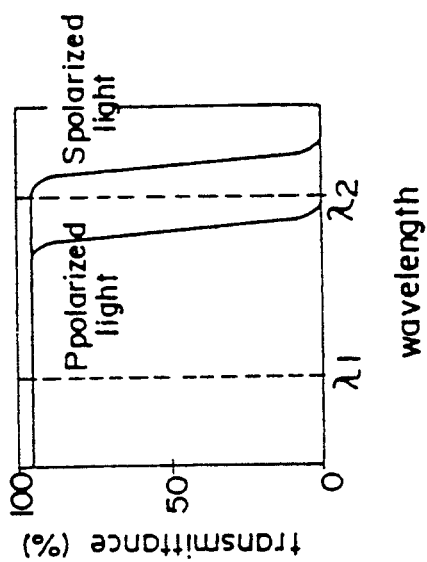
FIGS. 3a through 3c are illustrations showing the properties of the dichroic mirrors shown in FIG. 2.
Figure 3B:
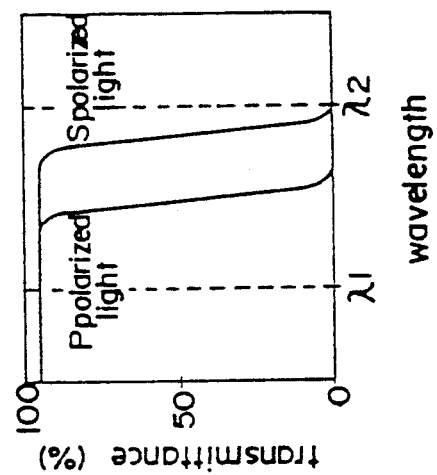
Figure 3C:
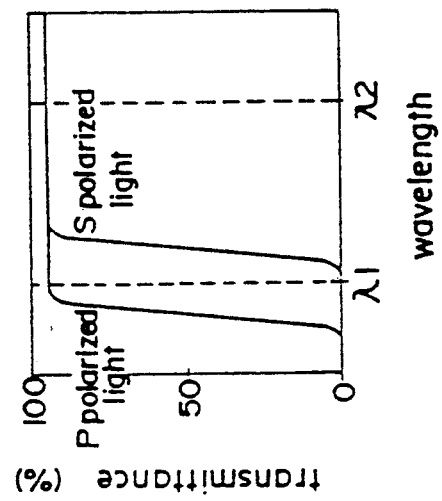

As shown in FIG. 3c, the dichroic mirror has characteristics wherein the wavelength $\lambda 2$ is set as the wavelength at the boundary of wavelength selectivity, and wavelengths shorter than said wavelength $\lambda 2$ are transmitted. In the aforesaid dichroic mirror, the selectivity curve shifts the S polarized light to the long wavelength side, and the P polarized light is shifted to the short wavelength side. That is, the dichroic mirror having the aforesaid characteristics is such that the S polarized beam of wavelength $\lambda 2$ is transmitted therethrough, whereas the P polarized beam of wavelength $\lambda 2$ is reflected therefrom. As shown in FIG. 5a, the dichroic mirror has characteristics wherein the wavelength $\lambda 2$ is set as the wavelength at the boundary of wavelength selectivity, and wavelengths longer than said wavelength $\lambda 2$ are transmitted. In the aforesaid dichroic mirror the selectivity curve shifts the S polarized light to the long wavelength side, and the P polarized light is shifted to the short wavelength side. That is, the S polarized light is polarized in a direction perpendicular to the action surface, whereas the P polarized light is polarized in a direction parallel to the action surface.

In the present invention, the beams are combined using the aforesaid dichroic mirrors having the previously described characteristics.

Figure 2:
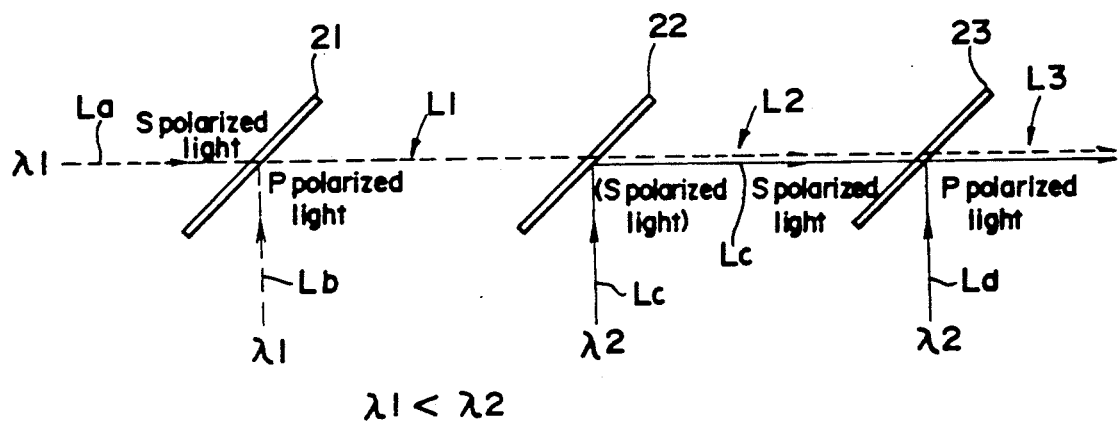
FIG. 2 is an illustration showing the beam combining method of the present invention.

FIG. 2 is an illustration showing the beam combining method of the present invention. FIG. 3 illustrates the characteristics of the dichroic mirrors of FIG. 2.

As previously mentioned, the beam composite apparatus 20 combines the beam Lb with the beam La to produce the beam L1, combines the beam Lc with the beam L1 to produce the beam L2, and ultimately combines the beam Ld with the beam L2 to produce the beam L3 which comprises the four beams.

In the combining method shown in FIG. 2, the beam La and beam Lb are beams having a wavelength $\lambda 1$ (e.g., 750 nm). The beam Lc and beam Ld are beams having a wavelength $\lambda 2$ (e.g., 810 nm). The wavelength $\lambda 2$ is longer than the wavelength $\lambda 1$ ($\lambda > \lambda 2$).

The beams La and Lb are combined using the polarized light selectivity of the dichroic mirror 21. The dichroic mirror 21 is provided with characteristics such that the P polarized light of the beam La having the wavelength $\lambda 1$ is transmitted therethrough, whereas the S polarized light of the beam Lb having the wavelength $\lambda 1$ is reflected therefrom, as shown in FIG. 3a. The beam La enters the dichroic mirror 21 in the polarization direction of the S polarized light, and the beam Lb enters the dichroic mirror 21 in the polarization direction of the P polarized light, and said beams are combined to produce the beam L1.

In the illustration, the beam La may alternatively be the P polarized light and the beam Lb the S polarized light which enter the dichroic mirror 21 and are combined. In this case, the dichroic mirror is selected having characteristics such that only the P polarized light of wavelength $\lambda 1$ is transmitted therethrough.

Next, the beam L1 and the beam Lc are combined using the wavelength selectivity of the dichroic mirror 22. That is, the characteristics are such as to allow transmittance of the short wavelength side at the boundary between the wavelength $\lambda 1$ and the wavelength $\lambda 2$, i.e., the beams L1 and Lc are combined using the dichroic mirror 22 having characteristics such that the beam L1 of wavelength $\lambda 1$ is transmitted and the beam Lc of wavelength $\lambda 2$ is reflected without regard to the direction of polarization, as shown in FIG. 3b.

In the aforesaid composite, the beam L2 containing the beam Lc is set in the polarized direction so as to form the S polarized beam via the dichroic mirror 22 and thereby make possible the subsequent combination.

Then, the beam L2 and beam Ld are combined using the polarization selectivity and wavelength selectivity of the dichroic mirror 23.

The beam Lc contained in the beam L2 enters the dichroic mirror 23 so as to form the S polarized light, and the beam Ld enters so as to form the P polarized light. At this time, the dichroic mirror 23 is provided with characteristics such that only the S polarized light beam of wavelength $\lambda 2$ is transmitted, i.e., characteristics such that transmittance is allowed on the short wavelength side at the boundary of the wavelength $\lambda 2$.

Thus, the beam L2 is transmitted through the dichroic mirror 23 and the beam Ld is reflected by the dichroic mirror 23, such that the beam L2 and the beam Ld are combined to form the beam L3.

Alternatively to the arrangement of FIG. 2, it may be considered, for example, that the beam Lc contained in the beam L2 enters the dichroic mirror 23 so as to form P polarized light, and the beam Ld enters so as to form S polarized light.

In this case, the characteristics of the dichroic mirror 23 must be such that the S polarized beam of wavelength $\lambda 2$ is reflected, whereas the P polarized beam of wavelength $\lambda 2$ as well as the beam of wavelength $\lambda 1$ that is shorter than the wavelength $\lambda 2$. However, the dichroic mirror having the aforesaid characteristics is fundamentally impossible to manufacture.

Accordingly, as in the example shown in FIG. 2, when the beam L1 of wavelength $\lambda 1$ (hereinafter referred to as the "first beam"), the beam Lc of wavelength $\lambda 2$ which is longer than the wavelength $\lambda 1$ (hereinafter referred to as the "second beam") and the beam Ld (hereinafter referred to as the "third beam") are sequentially combined, the second beam may be the S polarized light when the aforesaid first and second beams are combined in the previous stage, such that the third beam may be the P polarized light when the aforesaid third beam is combined in the later stage.

When the second beam is P polarized light, the polarizer is positioned within the optical path toe the dichroic mirror 23. A plurality of beams may be combined in the same manner as in the aforesaid embodiment by converting the second beam to polarized light until the third beam is combined in the later sage.

The composite beam L3 may be separated in the beam splitter 50 in the reverse sequence to the sequence of the aforesaid combination, i.e., the composite beam L3 is split in the sequence of beam Ld, beam Lc, beam Lb and beam La beam by beam via the dichroic mirrors 51, 52 and 53 having the characteristics shown in FIGS. 3c, 3b and 3a.

Figure 4:
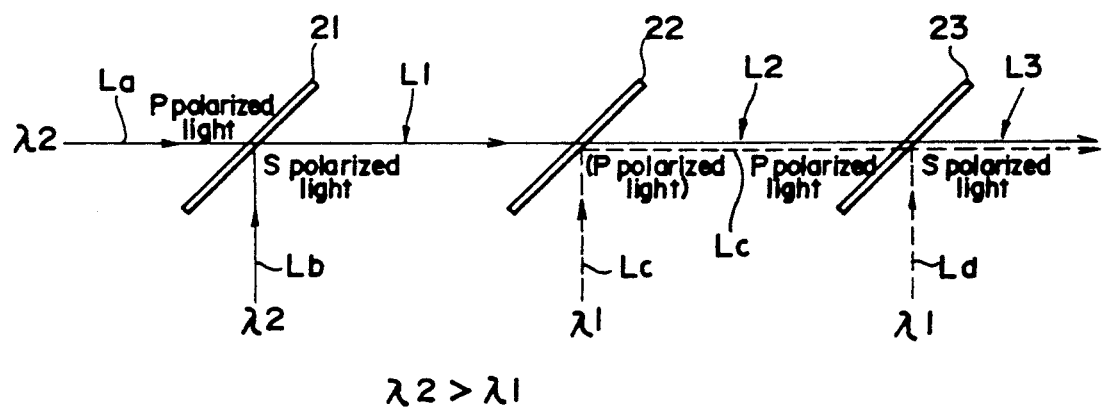
FIG. 4 is an illustration showing another embodiment of the beam combining method of the present invention.

FIG. 4 is an illustration showing another embodiment of the beam combining method of the present invention. FIGS. 5a through 5c are illustrations showing the properties of the dichroic mirrors shown in FIG. 4.

In the combining method shown in FIG. 4, the beam La and the beam Lb are beams of the wavelength $\lambda 2$, and the beam Lc and the beam Ld are beam so the wavelength $\lambda 1$ ($\lambda 1 > \lambda 2$).

As shown in the drawings, the beam La enters the dichroic mirror 21 as the P polarized light and the beam Lb enters as the S polarized light, and said beams La and Lb are combined.

At this time, the dichroic mirror 21 is provide with the characteristics shown in FIG. 5a, such that only the P polarized light beam La of wavelength $\lambda 2$ is transmitted.

Alternatively and opposite the aforesaid drawing, the beam La may be the S polarized light and the beam Lb may be the P polarized light entering the dichroic mirror 21 so as to be combined. In this case, the dichroic mirror 21 is provide with characteristics such that only the S polarized light beam of wavelength $\lambda 2$ is transmitted.

Next, as shown in FIG. 5b, the beam L1 and the beam Lc are combined to form the beam L2 using the dichroic mirror 22 which has characteristics such that the beam L1 of wavelength $\lambda 2$ is transmitted and the beam Lc of wavelength $\lambda 1$ is reflected.

In the combination at this time, the beam Lc contained in the beam L2 is set in the direction of polarization so as to form the P polarized light of the dichroic mirror 23.

Finally, the beam Ld enters the dichroic mirror 23 to form the S polarized light, and the beam L2 and the beam Ld are combined. At this time, the dichroic mirror 23 is provided with characteristics such that the P polarized light beam of wavelength $\lambda 1$ and the beam of wavelength $\lambda 2$ are transmitted, whereas the S polarized light beam of wavelength $\lambda 1$ are reflected, as shown in FIG. 5c.

Alternatively to the arrangement of FIG. 4, it may be considered, for example, that the beam Lc contained in the beam L2 enters the dichroic mirror 23 so as to form S polarized light, and the beam Ld enters so as to form P polarized light.

In this case, the characteristics of the dichroic mirror 23 must be such that the P polarized beam of wavelength $\lambda 1$ is reflected, whereas the S polarized beam of wavelength $\lambda 1$ as well as the beam of wavelength $\lambda 2$ that is longer than the wavelength $\lambda 1$. However, the dichroic mirror having the aforesaid characteristics is impossible to manufacture.

Accordingly, as in the example shown in FIG. 4, when the beam L1 of wavelength $\lambda 2$ (hereinafter referred to as the "first beam"), the beam Lc of wavelength $\lambda 1$ which is shorter than the wavelength $\lambda 2$ (hereinafter referred to as the "second beam") and the beam Ld (hereinafter referred to as the "third beam") are sequentially combined, the second beam may be the P polarized light when the aforesaid first and second beams are combined in the previous stage, such that the third beam may be the S polarized light when the aforesaid third beam is combined in the later stage.

According to the previously described embodiments, the four beams La, Lb, Lc and Ld may be readily combined. The composite beam L3 may be a two-wavelength beam of wavelength $\lambda 1$ and $\lambda 2$. A plurality of beams may be combined by providing a sequential relationship of wavelengths and polarization directions as previously described when combining the beams one by one. The number of wavelengths contained in the composite beam after combination may be small in comparison to the number of composite object beams at this time. That is, a plurality of beams may be combined by restricting the divergence of the wavelength range of the beam after combination, e.g., after combination the composite beam may be used for image formation to form high quality images.

According to the previously described embodiments, when the four beams La through Ld are combined said beams are combined sequentially one beam at a time in three stages. When the beam combination is accomplished using the polarization selectivity of two groups of beams having the same wavelengths (one group of beams La and Lb, another group of beams Lc and Ld) the degree of freedom in arranging the dichroic mirrors 21 through 23 and semiconductor lasers 11 through 14 is quite large compared to that when using the wavelength selectivity of both groups of composite beams after combination. Therefore, the apparatus can be constructed more compactly.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A laser beam composite apparatus comprising:
   first beam generating means for generating a first beam having a first wavelength;
   second beam generating means for generating a second beam having a second wavelength and polarized in a predetermined direction;
   third beam generating means for generating a third beam having the second wavelength and polarized in a direction perpendicular to the polarized direction of said second beam;
   a first dichroic mirror which reflects one of either said first beam or said second beam and transmits therethrough the other beam whereby said first dichroic mirror guides said first beam and said second beam entering from different directions in the same direction so as to form a composite beam by combining of said first and second beams; and
   a second dichroic mirror which reflects one of either said composite beam or said third beam and transmits therethrough the other beam whereby said second dichroic mirror guides said composite beam and said third beam entering from different directions in the same direction so as to combine said composite beam and said third beam.

2. An apparatus according to claim 1, wherein the first wavelength of said first beam is shorter than the second wavelength of said second beam, and said second beam has a polarized direction which is perpendicular to a surface of said second dichroic mirror.

3. An apparatus according to claim 2, wherein said third beam has a polarized direction which is parallel to the surface of said second dichroic mirror.

4. An apparatus according to claim 1, wherein the first wavelength of said first beam is longer than the second wavelength of said second beam, and said second beam has a polarized direction which is parallel to the surface of said second dichroic mirror.

5. An apparatus according to claim 4, wherein said third beam has a polarized direction which is perpendicular to the surface of said second dichroic mirror.

6. A method for composing a plurality of laser beams, including the steps of:
   (a) combining a first beam having a first wavelength and a second beam having a second wavelength and polarized in a predetermined direction to form a first composite beam; and
   (b) combining said first composite beam combined in step (a) and a third beam having the second wavelength and polarized in a direction perpendicular to the polarized direction of said second beam by a dichroic mirror, which transmits the first composite beam and reflects the third beam, to thereby form a second composite beam.

7. An image forming apparatus comprising:
   first beam generating means for generating a first beam having a first wavelength;
   second beam generating means for generating a second beam having a second wavelength and polarized in a predetermined direction;
   third beam generating means for generating a third beam having the second wavelength and polarized in a direction perpendicular to said polarized direction of said second beam;
   a first dichroic mirror which reflects one of either said first beam or said second beam and transmits therethrough the other beam whereby said first dichroic mirror guides said first beam and said second beam entering from different directions in the same direction so as to form a first composite beam by combining of said first and second beams; and
   a second dichroic mirror which reflects one of either said first composite beam or said third beam and transmits therethrough the other beam whereby said second dichroic mirror guides said first composite beam and said third beam entering from different directions in the same direction so as to form a second composite beam by combining of said first composite beam and said third beam;
   scan means for scanning said second composite beam;
   image bearing means for bearing images to be formed by said first, second and third beams; and
   separate means, provided between said scan means and said image bearing means, for separating said first, second and third beams from each other and guiding the first, second and third beams to the portions of image bearing means different from each other.

8. An apparatus according to claim 7, wherein said separate means includes a third dichroic mirror which transmit said first composite beam and reflects said third beam.

9. An apparatus according to claim 8, wherein said separate means further includes a forth dichroic mirror which transmit said first beam and reflects said second beam and guiding the first beam and second beam to the image bearing means.

10. An apparatus according to claim 7, wherein said image bearing means has a plurality of image bearing members.

* * * * *